United States Patent [19]

Pieters et al.

[11] 3,787,620

[45] Jan. 22, 1974

[54] DENSITY MEASUREMENT BY IMAGE ANALYSIS

[75] Inventors: Leon Andre Pieters, Cambridge; David Charles Ward, Melbourn, near Royston, both of England

[73] Assignee: Image Analysing Computers Limited, Melbourn, Royston, England

[22] Filed: Mar. 24, 1972

[21] Appl. No.: 237,724

[30] Foreign Application Priority Data

| | | |
|---|---|---|
| Apr. 17, 1971 | Great Britain | 9,739/71 |
| Apr. 17, 1971 | Great Britain | 9,740/71 |
| Apr. 17, 1971 | Great Britain | 9,737/71 |

[52] U.S. Cl. .......... 178/7.1
[51] Int. Cl. .......... H04n 3/16
[58] Field of Search .......... 178/7.1; 340/172.5

[56] References Cited

UNITED STATES PATENTS

| | | | |
|---|---|---|---|
| 3,368,033 | 2/1968 | Dischert et al. | 178/7.1 |
| 3,325,787 | 6/1967 | Angell et al. | 340/172.5 |
| 3,591,715 | 7/1971 | Rubin et al. | 178/7.1 |
| 3,674,931 | 7/1972 | Fazio et al. | 178/7.1 |
| 3,553,362 | 1/1971 | Mounts | 178/7.1 |
| 3,510,576 | 5/1970 | Centanni | 178/7.1 |
| 3,472,958 | 10/1969 | Estock | 178/7.1 |

*Primary Examiner*—Gareth D. Shaw
*Attorney, Agent, or Firm*—Francis C. Browne et al.

[57] ABSTRACT

A first system is described for analysing features according to their optical density in which an image of the features is formed on a television camera tube target and a video signal is generated by scanning in known manner. The video signal is subsequently amplified to produce an output voltage which is logarithmically related to the video signal and integration of the output signal pulses provides a measure of the total integrated density of the detected feature content in the field. The invention thus utilises the light integrating properties of a television camera tube.

Two methods of removing amplitude excursions relating to unwanted regions and features of the field are also described.

A signal corresponding to the mean density of detected feature content is obtained by dividing the total integrated density signal by one relating to the area of the detected features.

A method is disclosed for relating the density information arising during a field scan to the features in the field from which the information arises and releasing the accumulated density information for each feature at a unique point in the line scan. This is achieved by employing an associated parameter computer such as is described and claimed in British Patent Specificiations Nos. 1,264,804 and 1,264,805.

21 Claims, 4 Drawing Figures

DENSITY MEASUREMENT BY IMAGE ANALYSIS

Figure 1:
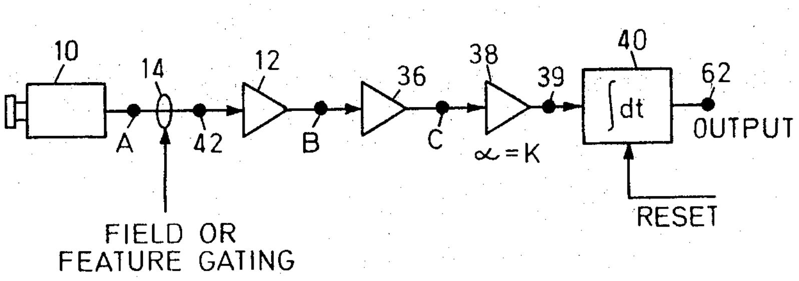

This invention relates to an image analysis system for obtaining a signal indicative of the optical density of a semi-transparent feature whose surroundings in a field containing the feature have a light transmission factor which differs from that of the feature so that if illuminated from below, the feature appears either lighter or darker than its surroundings. Such a feature will be referred to as a transmission feature.

Such a feature is commonly found in a microscope slide prepared from animal or vegetable tissue. Where the tissue is colourless it may be stained with a suitable dye so that although the tissue is still semi-transparent its light transmission factor is rendered different from the surrounding mounting medium (usually clear glass) so that if illuminated from below, the light transmitted by the tissue is less than that transmitted by the surrounding medium. If the transmitted light is used to form an image which is converted to a video signal and then reproduced by a monochrome television monitor the tissues will appear dark against a light background in the reproduced image.

It is known to obtain a video-type signal by scanning techniques employing a photo cell as the light or photon senser in conjunction with some mechanical or electronic scanning system. The instantaneous amplitude of the video signal so produced will correspond to the brightness of the area of the image scanned at any instant or the transmission of the area of the field scanned at that instant.

Known arrangements are characterized by a low signal to noise ratio. The noise arises due to the random fluctuation of light level at the photo cell and is usually referred to as photon noise.

Due to the logarithmic relation between density and transmission, increasing photon noise will represent an increasing density error component. Thus, the photon noise fron a photo cell will represent a limitation on the density of features which can be detected using the photo cell as the photon sensor.

The amplitude of the video signal viewing such a field will alter as the scanning spot traverses a boundary between the light background and the darker stained tissue forming the feature.

As previously described in British Pat. specification No. 1,127,742, Metals Research Limited, and copending British Pat. application No. 20612/68 Image Analysing Computers Limited, the amplitude variation in the video signal may be translated into a binary signal having a zero level while the scanning spot traverses the lighter background and a 1-level all the time the scanning spot traverses the darker feature. The process of converting the original video signal into a series of electrical pulses of constant amplitude (i.e., a binary signal) is termed detection and the binary signal is conventionally referred to as a detected video signal Although the number of features present in the field and their size and sometimes shape are important parameters likely to be required in the medical and biological fields, it is often additionally required to determine the volume of a transmission feature in the field of view. This is particularly so where the features of interest are the cells making up an animal or vegetable tissue. Where a cell has been stained as previously described, it can be shown that a measure of its volume can be obtained by integrating the optical density over the area of the cell concerned.

According to the present invention a method of analysing an image of a field containing one or more features which are distinguishable by having greater optical density than the remainder of the field comprises the steps of illuminating the field, focussing the light transmitted by the field to form an image of the field on the target of a television camera tube causing an electron beam to scan the latter to generate an electrical video signal whose amplitude increases with decreasing brightness in the image (from zero (corresponding to complete transparency — i.e., zero density) to a maximum value (corresponding to the maximum opacity, i.e., maximum density to be measured)), amplifying the video signal to produce an output voltage which is logarithmically related to the video signal and integrating the output voltage pulses from the logarithmic amplifier.

The invention thus utilizes the light integrating properties of a conventional television camera tube.

If the target were a conventional photo-cell, the light available at any instant would correspond to the light transmitted through the minute area of the field scanned at that instant. Furthermore the time available to receive photons transmitted by that minute area will be the time for that minute area to be scanned. Thus if a particular area is transmitting 1,000 photons per second and the time to scan the area is 1/1000th of a second, only 1-photon will be available per frame from that area.

When a television camera tube is employed as the photon sensor, the total number of photons arriving at the target from the same area of the field referred to in the previous paragraph, will equal the product of the rate of photon transmission and the frame scan period. If there are 10 frames per second, the frame period will be one-tenth of a second and the total number of photons per frame will be 100. Therefore there will be 100 times the number of photons available on the camera target from the same area as that considered for the photo cell as the target.

The increase in available photons represents an increase in sensitivity over the known photo cell arrangements. Furthermore since the random variations in photon transmission will be the same whichever photon senser is employed, and since it is this variation which produces so-called photon noise, the signal to noise ratio will be much greater for a television camera tube than for a photo cell when the two are used in similar situations. This allows much denser features to be analysed than when using the photo cell under the limited light conditions which are desirable for biological work.

Preferably the amplitude excursions relating to the said remainder of the field are removed in known manner by threshold discrimination leaving only the amplitude excursions arising from scanning the distinguishable features. This may be effected either before or after amplification in the logarithmic amplifier.

Alternatively the video signal amplitude excursions corresponding to features in the field may be converted to a series of electrical pulses forming a detected video signal by comparing the video signal with a reference voltage. The electrical pulses forming the detected video signal are used to gate the video signal (before or after amplification) to allow through only video signal amplitude excursions which arise from scanning regions of the field which produce a video signal amplitude excursion which exceeds the reference voltage level.

The detected video signal pulses may to advantage be subjected to pulse width discrimination by which any pulses of less than a selected duration are prevented from gating the video signal. This will prevent small dirt particles (which in general will have a high density value) from 'gating' the video signal.

If the mean feature density is required, circuit means is provided for dividing the feature volume signal by a signal indicating the area of the feature or features. This will be the true mean density of the feature if the volume signal is unique to one feature.

Where more than one feature is present in a field (for example two semi-transparent cells in a microscope slide containing a transparent mounting medium) the density information arising during a field scan will relate to both features in the field. An average measure of the volume of the cells can be obtained by dividing the total density integral by the number of the cells in the field. If the density information is required for each feature separately the density information obtained during a frame scan must be related to the particular features producing the information. This can be achieved by modifying an associated parameter computer such as is described and claimed in British Patent Specifications Nos. 1,264,804 and 1,264,805, so that the density information signals arising from each feature are associated and integrated separately and released at points in the scan unique for each feature.

If absolute values for volume are required means is provided for multiplying the integrated signal by a constant derived from the product of the spot size and velocity.

Figure 2:
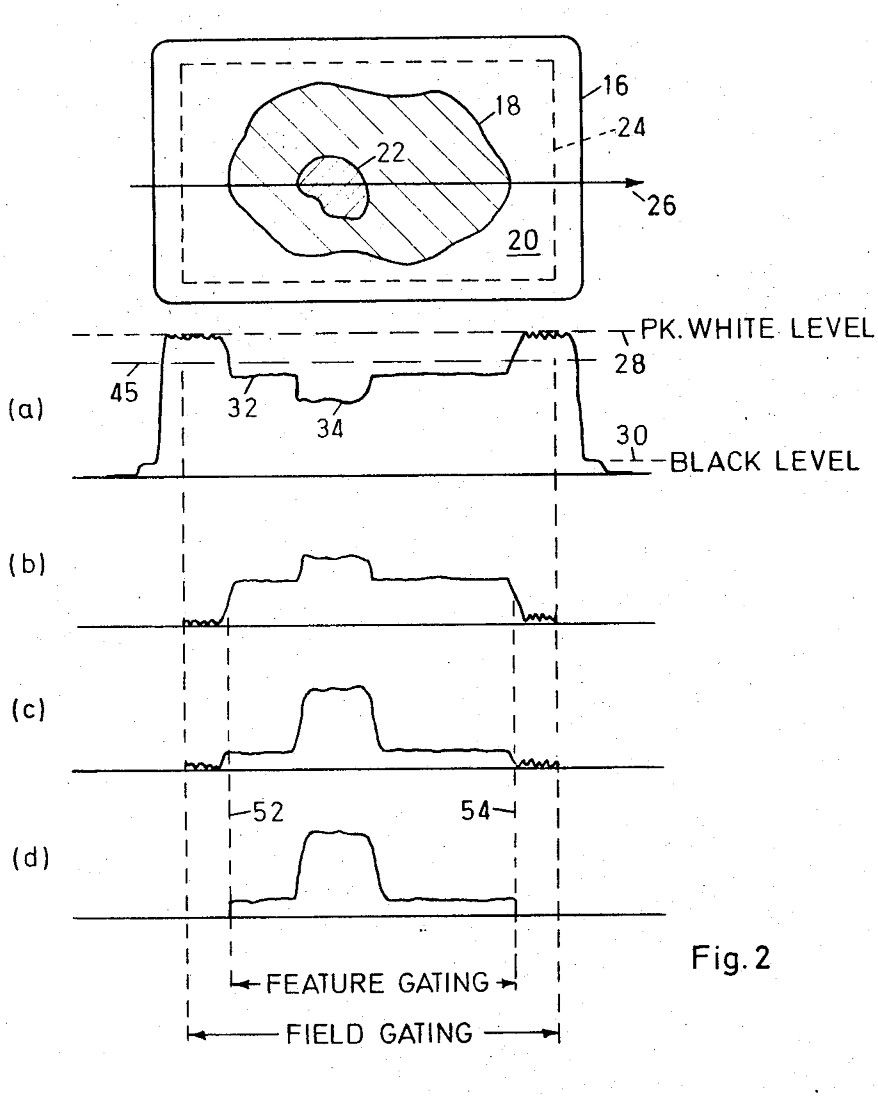
Figure 3:
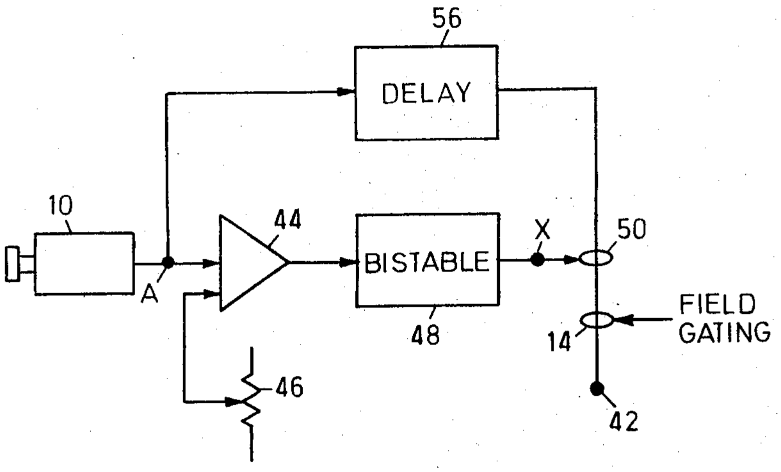
Figure 4:
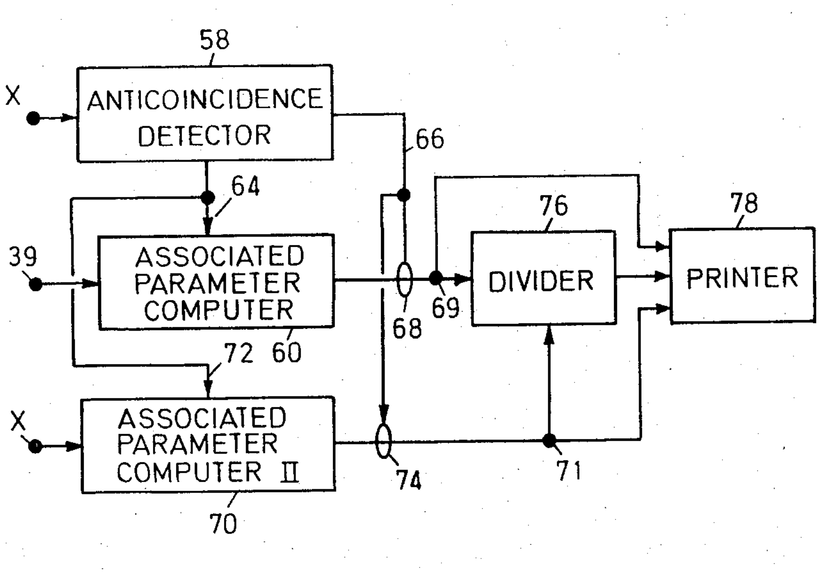

The invention will now be described by way of example with reference to the accompanying drawings in which:

FIG. 1 is a block circuit diagram of a circuit arrangement for obtaining an electrical signal indicative of the total integrated density (i.e., volume) of features in a field, FIG. 2 illustrates a field of view containing a single biological cell with nucleus and FIGS. 2*a* to 2*d* are graphical representations of the wave form of the video signals obtainable at different points in the circuit of FIG. 1, due to a single line scan intersection shown in FIG. 2, FIG. 3 is a block circuit diagram of a modification which may be made to the circuit arrangement of FIG. 1, and FIG. 4 is a block circuit diagram of a further modification which may be made to the circuit of FIG. 1.

In FIG. 1 a television camera 10 is illustrated as comprising a source of scanned video signal. The output from the television camera 10 is applied to the input of a first amplifier 12 via a gate 14 which is opened by gating signals which define within the scanning raster a so-called blank frame. This is generated by opening the gate 14 only during a portion of each line scan and inhibiting any opening of the gate 14 during the first few line scans of each field.

FIG. 2 illustrates the display which would be obtained on a television monitor screen 16 with the television camera 10 viewing a biological cell 18 which is partly transparent and therefore appears grey on a substantially while background 20. The cell 18 is shown as including a dark nuclear region 22 which, since it is more opaque to light will appear dark grey in the displayed picture.

The effect of the blank frame gating is illustrated by the dotted outline 24 and a typical line scan which intersects background, cell and nucleus is indicated by line 26.

Whereas the black level of the video signal can be clamped, in known manner, to remain constant throughout the scan, the white level cannot be clamped and is usually subject to variation due to non-uniformity of sensitivity over the area of the camera tube target. The resulting variation in white level is referred to as shading and will introduce errors in the measurement of density and/or volume. Consequently it is assumed that the source of video signal is corrected for shading so as to produce a more uniform white level over the scan. One device for shading correction is described and claimed in copending British Patent Application No. 30562/70 although it is to be understood that this is only referred to as an example of the various ways in which shading correction can be effected. The various voltage waveform representations have been drawn on the assumption that shading correction has been incorporated in the source of video signal.

FIG. 2*a* illustrates graphically the waveform of the video signal which will be obtained during line scan 26 if 'white is positive' modulation of the video signal is employed. No account is taken of typical synchronising pulses which are usually contained in such a video signal and consequently the amplitude of the signal beyond the limits of the scan raster is shown as zero. However at the beginning and ending of each scan line it is assumed that the amplitude of the video signal will correspond to that obtained when scanning a black region in the field and as soon as the line is shown intersecting a region of the field (which at the edges will correspond to the transparent white background) the amplitude of the video signal is seen to rise sharply to approximately the peak white level. The peak white level is denoted by dotted line 28 in FIG. 2*a* and the amplitude level of the video signal corresponding to black is denoted by dotted line 30.

As the spot scans along line 26, it first intersects the leading edge of cell 18 and since the cell is less white than the background, the amplitude of the video signal will drop and then remain substantially constant at the level indicated by 32 in FIG. 2*a* as the spot traverses the cell. When the spot intersects the leading edge of the nucleus 22, the amplitude of the video signal will again drop sharply to a new low level which is nearer to black and denoted by reference 34. The reverse will occur as the scanning spot leaves the nucleus 22 and cell 18 finally leaves the field altogether at the end of the line scan.

First video amplifier 12 serves to invert the amplitude variations in the video signal relative to the peak white level. The waveform of the signal appearing at junction B (i.e., the output of amplifier 12) is shown at FIG. 2*b*.

The signal at B serves as an input to a second amplifier 36. The transfer function for amplifier 36 is selected so that the output signal at junction C respresnts the logarithm of the amplitude of the signal at B relative to the new reference voltage for the signal. This will have the effect of increasing the size of grey level amplitude variations in the signal at B relative to the white level amplitude excursions in the signal at B. The effect will be much as illustrated at FIG. 2*c* but it is to be understood that this is only a diagrammatic representation and is not intended to be an accurate logarithmic equivalent of the signal at B.

The signal at C serves as the input to a third amplifier 38 having a substantially linear transfer function. The amplification factor of amplifier 38 is chosen so that the signal at C is multiplied in effect by a constant multiplier K. The value of K is selected so that the amplified amplitude of the video signal appearing in the output of amplifier 38, at junction 39, is directly related to the optical density of the area of the field from which it was derived. The value of K can be determined mathematically and will be dependent on inter alia the light level employed for illumination of the cell, the light transmission factor for the optical system of any microscope employed and the optical to electrical transfer characteristic of the camera 10. Account will also have to be taken of any amplification or loss in the signal path between junction A and junction C.

The output from amplifier 38 is applied to an integrating circuit 40 which is gated so as to integrate all the signals arising during a selected interval of time, to present the integrated output at the end of that period of time and to then reset to a zero value ready to integrate signals arising during a successive selected interval of time. The selected interval is conveniently a single frame scan and the gating may be synchronized from the line and frame scanning circuits for the camera 10. Alternatively and preferably the gating signal is derived from that amployed to control the operation of gate 14. A signal indicating the end of each blank frame is employed to address the integrating stage 40 and release the signal derived by integrating for the duration of the frame scan and simultaneously to reset the store in the integrating stage 40 to zero ready to begin integration at the onset of a new field.

Where there are two or more features in a field (for example two biological cells 18) it is impossible with the circuit of FIG. 1 or 3 to distinguish between information relating to one or other of the two features. Although it is possible to obtain an average volume value for the features in the field, such information is of little value if the purpose of the analysis is to distinguish between cells according to their volume, as is often the case when attempting to distinguish between cells infected with disease and those which are unaffected.

In order to ensure that the density information arising during any field scan arises from one feature only, various methods of isolation may be employed. One method involves the adjustment of the boundaries of the blank frame 24 so as to define sufficient of the original field to encompass each cell in turn.

An automatic method of identifying each feature in the field of view in turn may be employed such as described in our copending British Patent Application No. 10287/71 or alternatively a so-called 'light pen' system may be employed in which each feature is identified by an operator and indicated by pointing a 'light pen' at the feature displayed on a monitor screen. Such a system is described in out co-pending British Patent Application No. 12313/71. In each of these arrangements, the video signal from the camera 10 is gated first by the blank frame gating signals and also by signals generated by coincidence of video signal line scan intersect information from the selected feature with a coordinate identifying signal related to the selected feature.

Although the methods described so far only allow one feature to be analysed per frame, this is no great disadvantage in the biological and medical fields where typical specimens constitute only one or two cells or pieces of tissue.

By reference to FIG. 2*c*, it will be seen that over a portion of each line scan part of the amplitude will relate to the background signal. In the particular line scan 26 this does not amount to a very high percentage of the total line but other line scans which could have been taken would contain a higher proportion of background content and indeed some of the line scans from the field illustrated in FIG. 2 will contain no feature information at all and will comprise solely background information. Although the amplitude of the background signal should be small relative to the amplitude of the video signal corresponding to the desired feature or features and particularly the nucleii 22, its cumulative effect over a complete field, especially where the field is large as compared with the actual area of the cell, can result in a high percentage error in the absolute value obtained by integrating over the complete field. Furthermore, the waveform representation shown in FIG. 2*a* is somewhat idealised and in practice the background will show a much higher degree of variation due to particles of dirt and other foreign matter in the mounting medium so that whereas the cell 18 may be readily distinguished from the background, other areas of the background may have a grey level approaching that of the cell.

The circuit arrangement of FIG. 3 represents an addition to be inserted between the output of the camera 10 and the input to the amplifier 12. Both the camera 10 and gate 14 are shown and the terminal 42 in FIG. 3 corresponds to the input of amplifier 12.

The video signal appearing at junction A is applied to one input of a differential amplifier 44 (operating as a voltage comparator) whose other input is provided with a reference voltage 45 (see FIG. 2*a*) from a reference voltage source 46 which may conveniently be a potentiometer as shown.

The output of the differential amplifier 44 when the amplitude of the video signal at A exceeds the reference voltage switches a bistable 48 into one of its two conditions. The alternative output from the differential amplifier 44 (i.e., when the amplitude of the video signal at A is less than the threshold reference voltage) resets the bistable 48 to its other stable condition. The two different states of the bistable 48 produce 'one' and 'zero' signals respectively at junction X.

The signal at X thus comprises a series of pulses of constant height, the duration of each pulse corresponding to the duration of the intersection of one of the line scans with a feature in the field. Consequently these pulses may be employed to open a gate 50 controlling the release of the video signal from junction A to the gate 14. Gate 50 will thus only be opened during each line scan for the period during which the line scan intersects the feature or features in the field. No background information will therefore pass through gate 50 and the effect of the gate 50 is shown by the dotted lines 52 and 54 in FIGS. 2*b* to 2*d*. FIG. 2*d* also illustrates the resulting waveform at junction C in FIG. 1 when modified by FIG. 3 and can be compared with that which would be obtained at junction C (as shown in FIG. 2*c*) without the addition of the FIG. 3 modification.

A signal delay device 56 is inserted in the signal path between junction A and gate 50 to accommodate any delay introduced by the amplifier 44 and bistable 48 in the signal path producing the gating signals at junction X. No account is taken of the time shift introduced by the delay device 56 in FIG. 2*d*.

Although as shown the actual binary-type detected video signal pulses are shown operating the gate 50 it is to be understood that the invention is not limited to this particular arrangement and the binary-type detected signal pulses may be stretched prior to their being employed to operate the gate 50. In this way the gate will be opened in advance of a leading edge of a video signal amplitude excursion and closed some time after the trailing edge of the excursion arising from scanning a feature, thus reducing errors which might otherwise occur on features having diffuse boundaries.

In addition or alternativaly the binary-type pulses may be size discriminated to remove short duration pulses arising from the detection of noise spikes and/or excursions due to dirt dust particles in the field.

The FIG. 3 modification will reduce errors in the output signal from integration stage 40 whether the field contains one or more features. Furthermore, the so-called detected video signal obtained at junction X in FIG. 3 may be employed to operate an anti-coincidence detector 58 forming part of a further modification which may be added to the circuit of FIG. 1 and is shown in FIG. 4.

This further modification allows density information to be obtained for each of two or more features in a field during a single scan. The system modification shown in FIG. 4 comprises in addition to the anti-coincidence detector 58, an associated parameter computer 60 to which is supplied the output from the amplifier 38 appearing at junction 39. The computer 60 includes an integrator (not shown) which is reset at the end of each detected signal pulse and a memory capable of holding separately the total integrated information and recirculating this information at intervals of one line scan period. A signal path 64 conveys gating signals from the anti-coincidence detector 58 to the computer 60 to cause the computer to update the integrated information relating to previoue line scan intersections with a feature during each successive line scan intersection therewith. The anti-coincidence detector 58 is arranged to generate a single gating pulse just after the last line scan intersection with each feature and this is applied via signal path 66 to open a gate 68 to thereby release all the information stored in the computer memory at that instant of time in the scan. Simultaneously the gating pulse on the line 66 is arranged to inhibit the further recirculation of the information which is released at that instant in time and to thereby free that part of the memory in the computer 60 to allow it to be used for the storage of information arising later in the field.

The anti-coincidence detector 58 and computer 60 are more fully described in U.S. Pat. No. 3,619,494 which is incorporated herein by reference.

A second associated parameter computer 70 is also shown in FIG. 4 to which is supplied the line scan intersect pulses from junction X in FIG. 3. This second computer 70 is also controlled by the anti-coincidence detector 58 and to this end a signal path 72 is shown between the two. The operation of the second computer 70 is to add each line scan intersect arising from a feature to all other line scan intersects in the feature to produce a signal indicative of the area of the feature. This information is available at the same instant in time as that relating to the volume of the feature and can be released by a gate 74 operated by the same pulse as that which operates gate 68. The area signal is applied to one input of a divider 76 and the volume information signal released by gate 68 is applied to the other input of the divider 76. The quotient signal then corresponds to the mean density of the feature and the output from the divider 76 forms one input to a printer 78.

Alternatively the output from the divider 76 may be applied directly to a further computer or specialized information handling facility by which value discrimination may be applied to the signals representing the mean density of the various features in the field.

The volume signals at junction 69 and area signals at junction 71 typically constitute other input signals for the printer 78.

Although the invention has been described specifically with reference to voltage magnitudes and therefore, analogue signals, it is to be understood that where appropriate analogue to digital signal converters may be provided to provide any or all of the voltage produced from processing the video signal, in digital form. Likewise where for example the area value produced by summing the detected video signal pulses over each frame scan period, is in digital form, suitable digital to analogue conversion means may be provided so that two analogue signals are available for the process of division to arrive at the density value for the field or feature.

We claim:

1. A method of analysing an image of a field containing one or more features which are distinguishable by having greater optical density than the remainder of the field, comprising the steps of, illuminating the field, focusing the light from the illuminated field to form an image of the field on the target of a television camera tube, causing an electron beam to scan said television camera tube to generate an electrical video signal, amplifying said video signal, logarithmically amplifying said amplified video signal to produce an output voltage which is logarithmically related to said amplified video signal, and integrating said output voltage from said logarithmic amplifier.

2. A method as set forth in claim 1 further comprising the step of subjecting the video signal to threshold discrimination whereby only amplitude excursions arising from features which produce voltage excursions of the video signal greater than the threshold voltage are logarithmically amplified.

3. A method as set forth in claim 1 further comprising the step of subjecting the output voltage from the logarithmic amplifier to threshold discrimination.

4. A method as set forth in claim 1 further comprising the steps of comparing the amplitude excursions of the video signal with a reference voltage, generating a gating pulse each time the amplitude of the video signal exceeds the reference voltage and opening a gate in the video signal path for the duration of each gating pulse thereby passing only video signal amplitude excursions which arise from scanning regions of the field which produce a video signal amplitude excursion which exceeds the reference voltage level.

5. A method as set forth in claim 4 further comprising the step of delaying the video signal before application to the gate to compensate for signal delays introduced by said comparing, generating and opening.

6. A method as set forth in claim 5 further comprising the step of stretching each gating pulse by a known increment of time thereby to open the gate for a longer period of time than the actual duration of the amplitude excursion to which the gating pulse relates.

7. A method as set forth in claim 4 wherein said output voltage is integrated during each frame scan period to thereby generate a voltage whose magnitude is indicative of the total feature volume in the field.

8. A method as set forth in claim 7 wherein said integration is performed by a resettable means for integrating the amplifier output signal, further comprising the step of resetting said means for integrating at the end of each frame scan period.

9. A method as set forth in claim 8 further comprising the steps of summing the gating pulses obtained by comparing the video signal amplitude excursions with a reference voltage during each frame scan period to obtain a voltage whose magnitude is indicative of the total area of the detected features in the field, dividing the voltage obtained by integrating the logarithmic amplifier output voltage during each frame scan period by the area voltage and generating a further voltage whose magnitude is indicative of the quotient of total integrated density and area.

10. A method as set forth in claim 4 further comprising the step of pulse width discriminating the gating pulses and inhibiting the passage of pulses of less than a selected duration.

11. A method as set forth in claim 1 wherein said electron beam is caused to scan said tube in a line by line manner and each line scan results in a video signal which may include a pulse corresponding to one of said features which pulse is logarithmically amplified further comprising the steps of integrating separately each logarithmic amplifier output pulse, delaying the integrated pulse obtained during the first line scan for one line scan period, adding the delayed integrated pulses to any arising during the next line scan, re-circulating the summed pulses and adding thereto pulses arising during the next line scan to the end of the frame, identifying the last line scan intersection with each feature, generating a release signal on the next line scan after the last line scan to intersect a feature and causing the release signal to open a gate and release the summed integrated pulses relating to the feature instead of recirculating them.

12. A method as set forth in claim 11 wherein integrated pulses relating to density are circulated separately from pulses relating to area, the total integrated density signal and total area signal for each feature are released simultaneously and the one divided by the other to generate for each feature a voltage equal to its integrated density divided by its area.

13. A method as set forth in claim 1 further comprising the steps of selecting a portion of each line scan period and inhibiting the video signal other than during that period, selecting certain of the line scans making up a complete frame scan period and inhibiting the passage of the video signal during non-selected line scans thereby to define a region within the scanned area from which a video signal is obtained during each frame scan.

14. A method as set forth in claim 4 further comprising the steps of selecting each feature separately and successively by means of a light pen means.

15. An image analysis system for analysing an image of a field including one or more features which are distinguishable by having greater optical density than the remainder of the field, comprising, a television camera arranged to view the field under analysis for generating a video signal corresponding thereto, first amplifier means responsive to said video signal for generating an amplified video signal, second amplifier means having a logarithmic transfer function responsive to said amplified video signal to produce an output signal in which the voltage excursions are logarithmically related to the corresponding excursions in said amplified video signal, and means for integrating the output signal of said second amplifier means to generate a volume signal.

16. An image analysis system as set forth in claim 15 further comprising third amplifier means having a preset fain for amplifying the amplitude of the logarithmic amplifier output signal prior to integration.

17. An image analysis system as set forth in claim 15 further comprising voltage comparator means for comparing the video signal voltage excursions with a reference voltage, means for generating a gating pulse for the duration of each amplitude excursion which exceeds the reference voltage and gating means in the video signal path operated by the gating pulses to release only the video signal amplitude excursions which exceed the reference voltage.

18. An image analysis system as set forth in claim 15 wherein said television camera scans said field in a line by line manner and each line scan results in a video signal which may include a pulse corresponding to one of said features, said logarithmic amplifier amplifying said pulses, further including associated parameter computer means for integrating each logarithmic amplifier output pulse and for adding the integral value to that arising from coincident pulses on previous line scans, and anti-coincidence detector means for generating a release signal on the line scan after the last line scan to intersect a feature to release the total integrated voltage for the feature.

19. An image analysis system as set forth in claim 18 further comprising a second associated parameter computer means for computing a voltage equal to the area of each feature in the field, the release signal for said first computer means also serving as a release signal for said second computer means to release both said total integrated signal and said area signal simultaneously for each feature.

20. An image analysis system as set forth in claim 19 further comprising circuit means for dividing for each feature the voltage outputted by said first computer means by the voltage outputted by said second computer means.

21. An image analysis system as set forth in claim 20 further comprising automatic printing means for printing values corresponding to said computer means output voltages for each of the two computer means and the quotient value from said circuit means.

* * * * *